US006823362B2

(12) United States Patent
Eshghi

(10) Patent No.: US 6,823,362 B2
(45) Date of Patent: Nov. 23, 2004

(54) EFFECTIVELY AND EFFICIENTLY UPDATING CONTENT FILES AMONG DUPLICATE CONTENT SERVERS

(75) Inventor: Kave Eshghi, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 616 days.

(21) Appl. No.: 09/981,129

(22) Filed: Oct. 16, 2001

(65) Prior Publication Data

US 2003/0074394 A1 Apr. 17, 2003

(51) Int. Cl.[7] .......................... G06F 15/16; G06F 15/167
(52) U.S. Cl. ....................... 709/203; 709/214; 709/227
(58) Field of Search ................................ 709/203, 214, 709/227

(56) References Cited

U.S. PATENT DOCUMENTS 5,617,540 A * 4/1997 Civanlar et al. ....... 370/395.54
6,374,295 B2 * 4/2002 Farrow et al. .............. 709/223
6,564,216 B2 * 5/2003 Waters ........................ 707/10
6,654,891 B1 * 11/2003 Borsato et al. ............. 713/201
2001/0014917 A1 * 8/2001 Ishiyama et al. ........... 709/227
2002/0010767 A1 * 1/2002 Farrow et al. .............. 709/223
2002/0052876 A1 * 5/2002 Waters ....................... 707/100

* cited by examiner

Primary Examiner—Kevin Verbrugge

(57) ABSTRACT

A data service system includes a number of duplicate content servers that host a content file with a file name. Each of the content servers stores a version of the same content file that is referred to by a file reference. An updating engine is also provided that, when receiving an update of the content file, generates an updated version of the content file. A file name binding server is coupled to the updating engine and the content servers to generate a new file reference for the updated version of the content file. The file name binding server updates each of the content servers with the updated version by sending the new file reference to a binding table in each of the content servers. A content store is provided to store the updated version of the content file before it is fetched by a content server. Each of the content servers includes a binding table that stores the most recent file reference referenced by the file name of the content file.

16 Claims, 4 Drawing Sheets

EFFECTIVELY AND EFFICIENTLY UPDATING CONTENT FILES AMONG DUPLICATE CONTENT SERVERS

BACKGROUND OF THE INVENTION

1. Field of the Invention

The present invention pertains to Internet/Intranet systems. More particularly, this invention relates to effectively and efficiently updating content files among multiple duplicate content servers of a data service system.

2. Description of the Related Art

FIG. 1 illustratively shows the Internet 10, which includes an Internet access gateway system 20 connected to a number of user access terminals 11a through 11n via an interconnect network 12. The user terminals 11a–11n can also be referred to as client systems. The gateway system 20 is connected to the global Internet 13, which is connected to a data service system 15. Here, the global Internet 13 is typically formed by a number of data service systems connected together via a high speed interconnect network.

Each of the user access terminals 11a–11n contains a browser software (i.e., 14–14n) that sends access requests to and receive responses from the gateway system 20. The browser (e.g., web browser or other software such as an e-mail software) allows its user (i.e., a person) to access the contents hosted in the data service system 15 through the corresponding user terminal.

FIG. 2 shows a prior art structure of the data service system 15. As can be seen from FIG. 2, the data service system 15 includes a content server. The content server 23 hosts contents for access by the users at the user terminals or client systems 11a–11n (FIG. 1). The content server 23 also includes a World Wide Web (WWW) Internet application, which follows the client-server model and rely on the Transmission Control Protocol (TCP) for reliable delivery of information between the sever and user terminals.

To alleviate overload conditions on the server 23, a number of duplicate web content servers 23a–23n are provided in the system 15. The overload condition occurs when the number of access requests to the content server 23 greatly exceeds the number of access requests the content server 23 can handle. This typically occurs when a large number of access requests are sent to the data service system 15 at the same time. To deal with this situation, the content servers 23a–23n are added in the data service system. The content servers 23a–23n have file systems which mirror each other, as well as that of the content server 23. This means that each content server keeps a local copy of the same content file in its local file system, and replies to user access requests by sending the requested file from its local file system. For example, when a user sends an access request with a URL (e.g., http://www.xyz.com/abc/def.html) for a content file, the file's path relative to the local file system is encoded in the URL (e.g., /abc/def.html). The content server that is assigned to service the request resolves the URL to the file requested and serves the files from its local file system. Since all of the servers 23–23n have the same file system, any one of the servers 23–23n handles the request will yield the same content file.

A load-balancing router 26 routes requests to one the web servers 23–23n. This balances load of each of the web servers and application servers. This also helps to prevent any individual server from being overloaded with requests.

The content files stored in all of the content servers 23–23n need to be updated whenever their content changes. For example, a Yahoo news site contains many news articles (i.e., content files). The articles are changed and updated regularly. One prior art way to achieve the update is to push, from a central server, the changed file to all of the content servers 23–23n as soon as the change occurs. In FIG. 2, this is done by employing an updating engine 24 to perform the updates. The database 25 serves to store any updates received.

When the update of a content file is received in the database 25, the updating engine 24 computes or generates the updated version of the content file using the updated information. Each of the content files is typically in the HTML (Hyper-Text Markup Language) web page format. The updating engine 24 then sends the updated version of the content file to each of the content servers 23–23n to replace the older version. This completes the update process for the content file.

However, disadvantages are still associated with this prior art approach. One disadvantage is that a given file sent to one of the content servers 23–23n may never be requested by a user of that content server. As a result, the cost of transmitting the updated version of the file to that content server and store it there is wasted.

Another disadvantage is that the prior art scheme of serving all updated files to all of the content servers 23–23n from the central updating engine 24 puts a large load on the updating engine 24. It also generates a large amount of data traffic within the data service system 15. If the content servers 23–23n are physically located at a geographically remote location from the updating engine 24, then the delay in transmitting the updated files to all the content servers 23–23n may be considerable.

In addition, if content consistency is a requirement, then a consistent state exists only when all of the content servers 23–23n have received and stored the updated version of the changed content file. This may take a long time.

SUMMARY OF THE INVENTION

One feature of the present invention is to effectively and efficiently updating content files among duplicate content servers of a data service system.

Another feature of the present invention is to maintain content consistency among multiple duplicate content servers while allowing accesses to these content servers at all times.

A further feature of the present invention is to allow early access to updated files.

In accordance with one embodiment of the present invention, a data service system includes a number of duplicate content servers that host a content file with a file name. Each of the content servers stores a version of the same content file that is referred to by a file reference. An updating engine is also provided that, when receiving an update of the content file, generates an updated version of the content file. A file name binding server is coupled to the updating engine and the content servers to generate a new file reference for the updated version of the content file. The file name binding server updates each of the content servers with the updated version by sending the new file reference to a binding table in each of the content servers.

In addition, a content store is also provided in the data service system to store the updated version of the content file before it is fetched by a content server. Each of the content servers includes an HTTP engine, a file manager, a file reference binding table, and a cache. During operation, when a request for the content file is received in one of the content servers, the HTTP engine extracts the file name of the content file from the URL (Universal Resource Locator) of the request. The file name is then used by the file manager to access the binding table for the corresponding file reference of the file name. The file manager then uses the file reference to access the cache to retrieve a version of the content file that corresponds to the file reference. If a cache hit is resulted (i.e., the corresponding version is in the cache), then the file manager retrieves that version from the cache. If a cache miss is resulted (i.e., the corresponding version is not in the cache), then the file manager performs a fetch operation to fetch that version of the content file into the cache from the content store.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
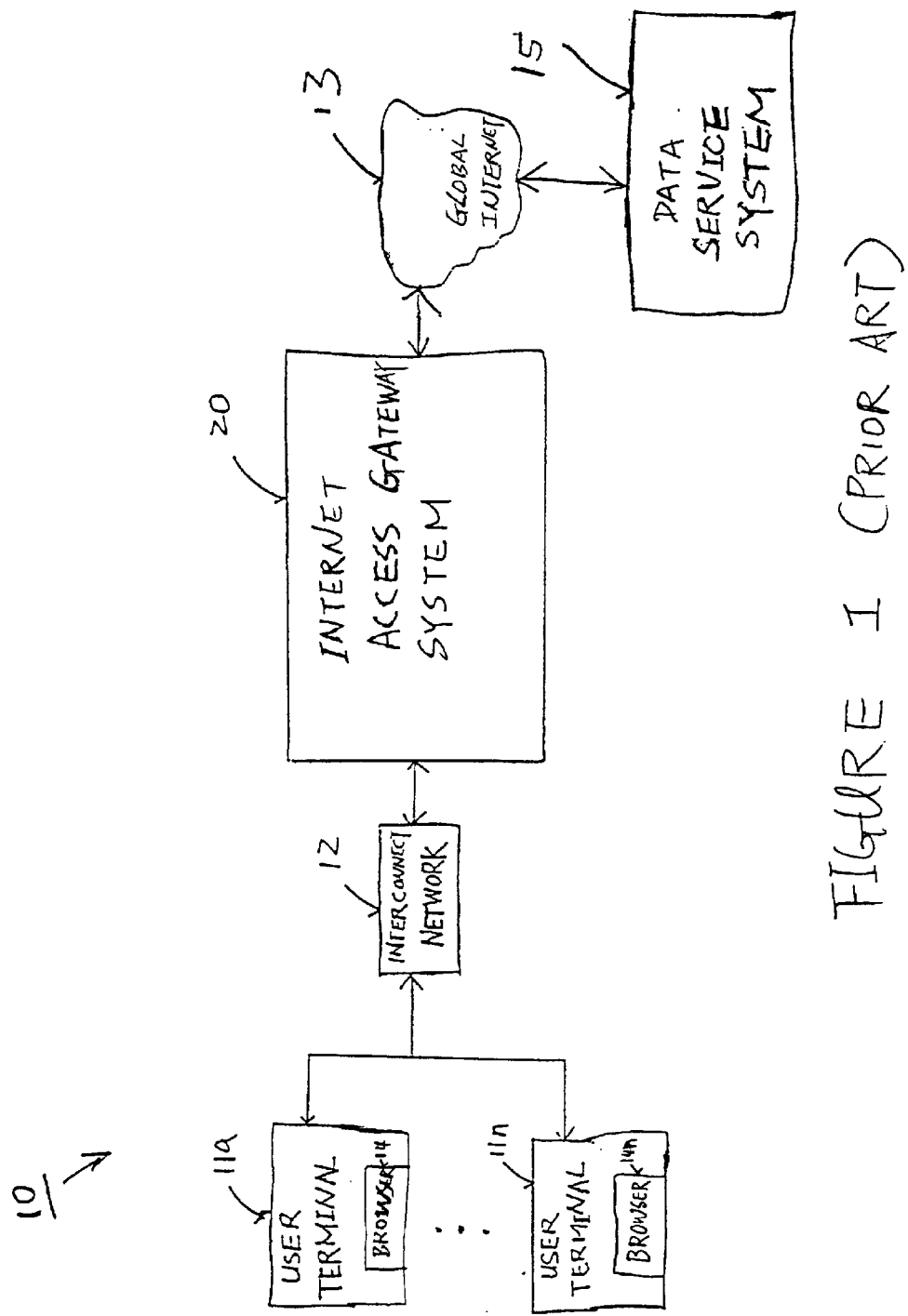
FIG. 1 illustrates an Internet system that includes a data service system implemented in accordance with prior art.
Figure 2:
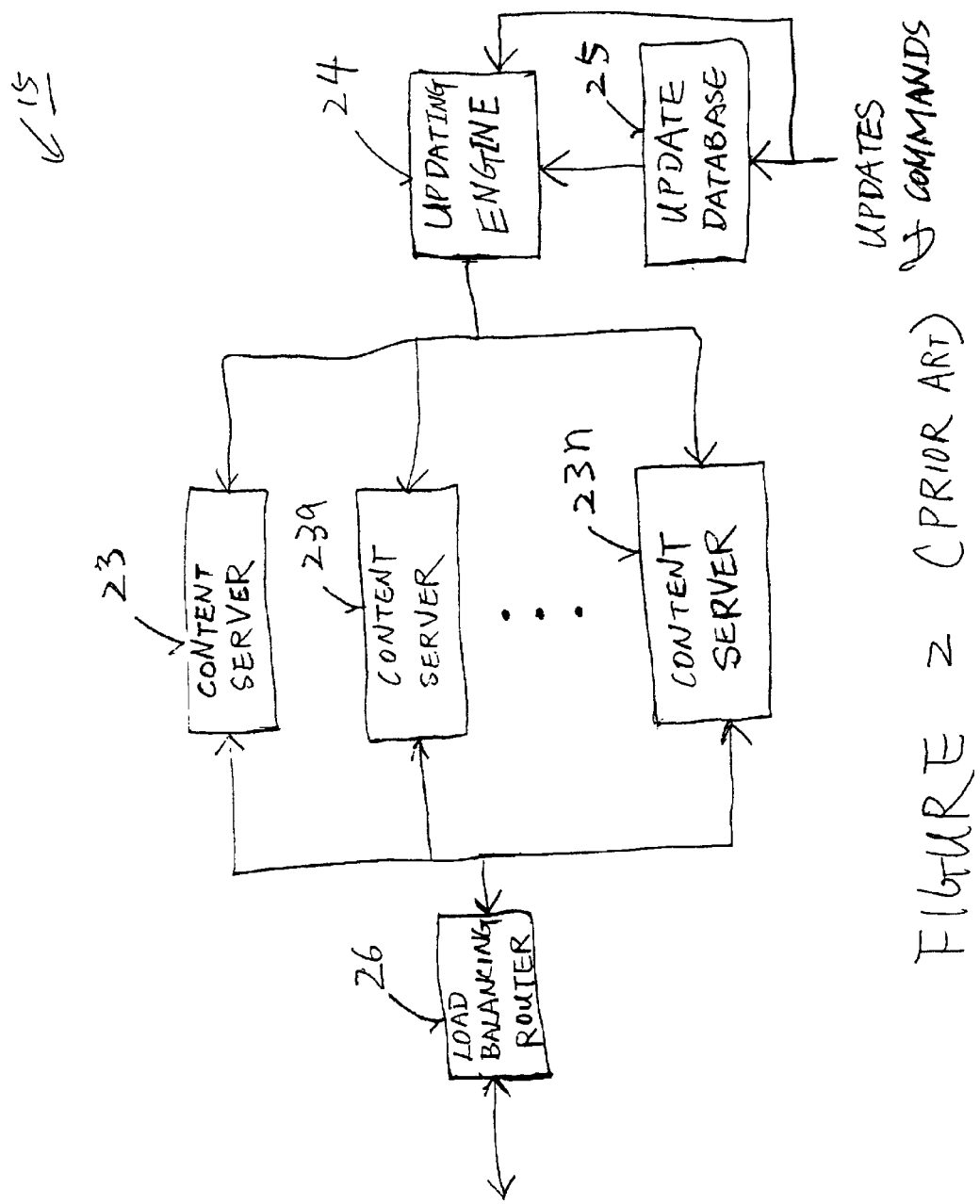
FIG. 2 shows the structure of the data service system of FIG. 1.
Figure 3:
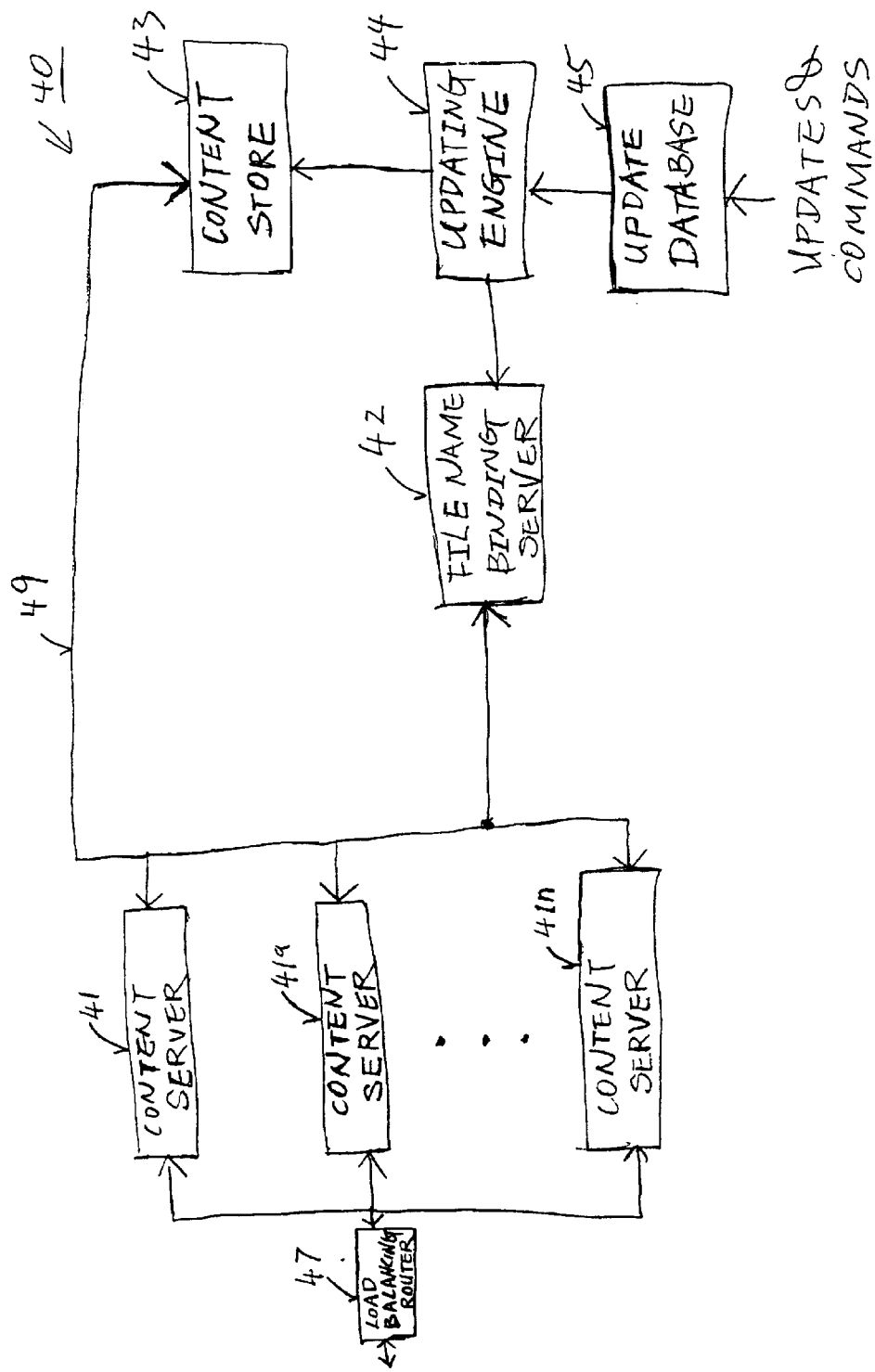
FIG. 3 shows the structure of a multi-server data service system in accordance with one embodiment of the present invention, wherein the data service system includes a number of web content servers, a file name binding server, a content store, an updating engine, and an update database.

FIG. 3 shows a data service system 40 that implements one embodiment of the present invention. The data service system 40 can replace the prior art data service system 15 in the Internet 10 of FIG. 1 to service user access requests generated from remote client systems (e.g., the client systems 11a–11n in FIG. 1).

As will be described in more detail below and in accordance with one embodiment of the present invention, the data service system 40 includes a number of content servers 41–41n that host content files, each having a file name. Each of the content servers stores a version of each content file. Each version of a content file is referred to by a file reference. The file reference is generated by applying a known cryptographic hash function (e.g., MD5 hash algorithm) to the content of this version of the file. An updating engine 44 is provided that, when receiving an update of a content file, generates an updated version of the content file. A file name binding server 42 is coupled to the updating engine 44 and the content servers 41–41n to generate a new file reference for the updated version of the content file. The file name binding server 42 then updates each of the content servers 41–41n with the updated version by only sending the new file reference to a binding table 104 in each of the content servers 41–41n. The updating engine 44 sends the updated version of the content file to a content store 43 before the updated version is fetched by a content server.

When an access request is received in a content server 100 (FIG. 4)(i.e., one of the content servers 41–41n) for the content file, the file name of the content file is extracted from the URL (Universal Resource Locator) of the request by an HTTP engine 101 of the content server 100. A file manager 102 of the content server 100 then uses the file name to accesses a file reference binding table 104 of the content server 100 in order to retrieve the corresponding file reference. The file reference should refer to the most recent version of the content file indicated by the file name. The file manager 102 then uses the file reference retrieved to access a cache 103 of the content server 100. The cache 103 stores a version of the content file. This version may or may not be the most recent version of the content file, but each version of the content file has a corresponding unique file reference. If the cache fetch operation to the cache 103 results in a cache miss, it means that the most recent version of the content file is not stored in the cache 103 and the file manager 102 will cause the most recent version of the content file that corresponds to the file reference to be fetched from the content store 43 (FIG. 3). If, however, a cache hit is resulted (i.e., the corresponding version is in the cache 103), then the file manager 102 retrieves that version from the cache 103.

One advantage of the above described arrangement in accordance with one embodiment of the present invention is consistency. Since the relationship between a file reference and a version of a content file is immutable and unique, caching the updated version of the content file and retrieving that version from the cache 103 will never lead to consistency problems.

Another advantage of the above described arrangement in accordance with one embodiment of the present invention is efficiency and effectiveness of the update operation. By only updating each of the content servers 41–41n with a file reference that uniquely refers to the updated version of a content file, the actual file update to each of the content servers 41–41n is maintained at minimal, thus effectively and efficiently updating content files among duplicate content servers. This is because the actual file update to a content server only happens when that server is accessed with a request for that content file. In that situation and as described above, the content server extracts the file name first, and then uses the file name to locate and retrieve the file reference that refers to the most recent version of the content file. The most recent version is then fetched into the content server, if not already in the server. For an end user's point of view, he will see the updated version of the content file as soon as the name binding table of the content server is updated. This allows earlier access to the updated files.

In addition, the arrangement in accordance with one embodiment of the present invention reduces workload on file transmission and update because fewer file updates will be performed. Moreover, it avoids retrieval and storage of files that are not requested. This is due to the fact that a content server may never receive a request for a given content file. In this case, no updated version of these unrequested content files will be transmitted to, or stored on the content server (although the file reference will be). This avoids the transmission and storage expenses of these files. The data service system 40 in accordance with one embodiment of the present invention will be described in more detail below, also in conjunction with FIGS. 3 and 4.

Referring to FIG. 3, the data service system 40 is part of an Internet system (not shown in FIG. 3). Data communications to and from the data service system 40 are conducted using a predetermined communication protocol for Internet/Intranet communications. In one embodiment, the communication protocol is the Hyper Text Transport Protocol (HTTP). Alternatively, other known communication protocols for Internet/Intranet communications can also be used. The data service system 40 is employed by an Internet/Intranet Service Provider (ISP) to offer data services (e.g., web, news, or advertisement) and other services (e.g., e-commerce, e-mail).

The data service system 40 can be implemented in a computer system or other data processing system. The computer system that implements the data service system 40 can be server computer system, a workstation computer system, a personal computer system, or a mainframe computer system, a notebook computer system, or any other computer system.

The data service system 40 includes a load-balancing router 47 that routes access requests to one of the content servers 41–41n. The router 47 sends a request to an available one of the content servers 41–41n. Another function of the router 47 is to balance the load of each of the content servers 41–41n. The router 47 can be implemented using any known technology.

The content servers 41–41n receive access requests from the router 47. Each of the content servers 41–41n stores the same content files as another one of the content servers 41–41n. Thus, the content servers 41–41n are duplicate content servers. In this case, no matter which one of the content servers 41–41n services a request, the response generated should be the same.

Each of the content servers 41–41n is structured around the HTTP protocol which is a request-and-response protocol, and is used to service requests. Each of the content servers 41–41n stores a number of content files that include Hyper-Text Markup Language (HTML) web pages, gif images, video clips, etc. Using a currently commercially available web browser and other client applications, users via their respective user terminals can access the content files stored in the content servers 41–41n. Each of the content files can be accessed by an access request. The content server 31 may also include a number of content sites, each storing a number of content files for access by multiple access requests. The multiple content sites may belong to different content providers or customers with potential conflicting interests. The structure of each of the content servers 41–41n is shown in FIG. 4, which will be described in more detail below.

Figure 4:
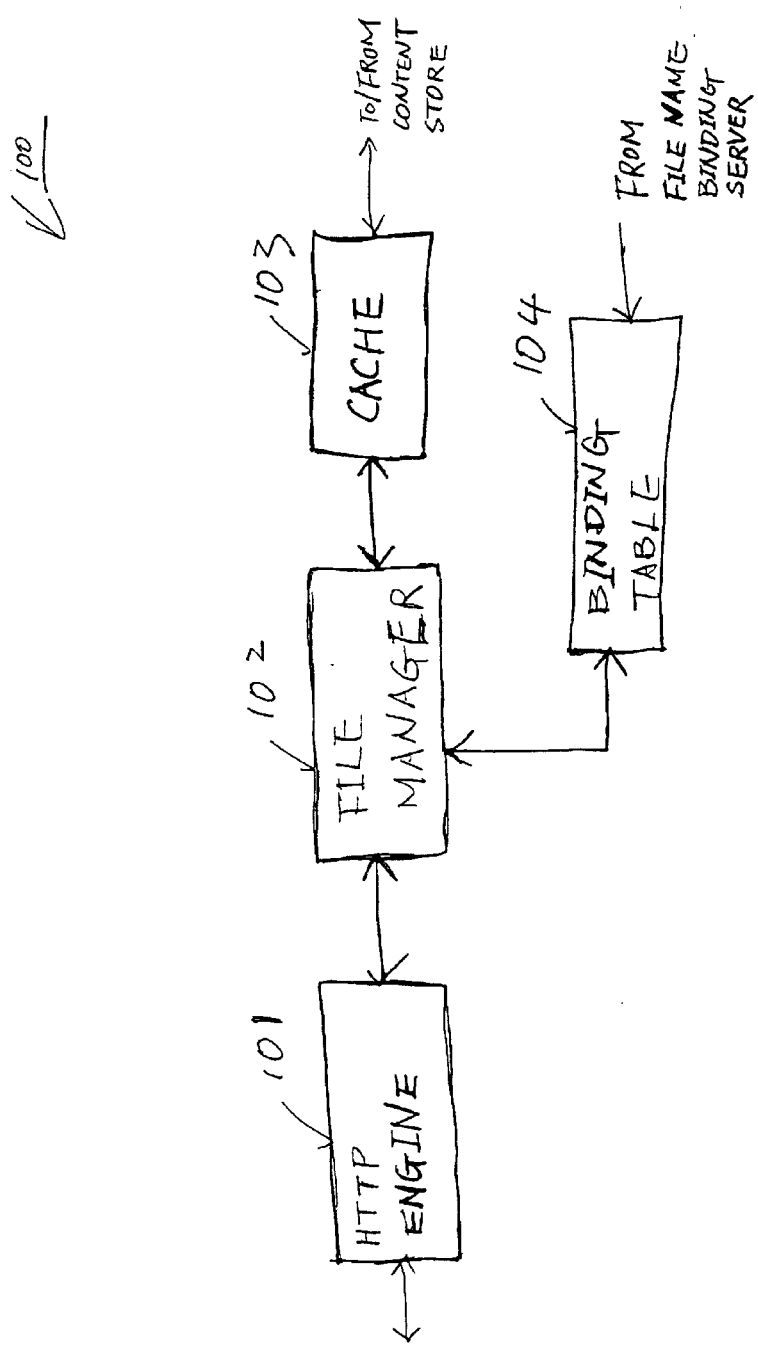
FIG. 4 shows the structure of any one of the web content servers of FIG. 3.

In FIG. 4, the structure of a content server 100 is shown. The content server 100 can be any one of the content servers 41–41n of FIG. 3. As can be seen from FIG. 4, the HTTP engine 101 of the content server 100 services any incoming request. The HTTP engine 101 is a standard HTTP daemon (e.g., Apache or IIS). One of the functions of the HTTP engine 101 is to extract, from the URL of the request, the file name of the content file requested. The HTTP engine 101 then sends the file name to the file manager 102 to retrieve the content file. The file manager 102 can be implemented using known file managing technology.

The file name is the way a file is identified in a file system. For example, in an URL of "www.hp.com/topics/domestics/news.html", the "/topics/domestics/news.html" is a file name. File names typically specify paths in a given directory structure to access the files. The content file is the actual information contents of the file. In a typical file system, the content of a content file may change while its file name remains unchanged.

In order to update content files hosted in each of the content servers 41–41n effectively and efficiently, the file manager 102 does not store any content files. Instead, the content files are stored in the cache 103. The cache 103 stores a version of each of the content files hosted in the content server 100. In addition, the content server 100 also includes the binding table 104. The binding table 104 is used to store name-reference bindings of all content files. In other words, the binding table 104 is used to map a file name to a file reference. When a request for a given file is received in the content server 100, the file manager 102 accesses the binding table 104 to find the binding for the given file name. The file manager 102 then uses the file reference retrieved to access the cache 103 for the content file. The file reference should be indicating a most recent version of the content file. If the cache 103 stores that version, the file is retrieved to the file manager 102. If the cache 103 does not store that version, then a fetch operation will be performed to bring that version into the cache 103. The file update operation and access operation will be described in more detail below, also in conjunction with FIGS. 3–4.

Referring back to FIG. 3, in order to update content files stored in each of the content servers 41–41n, the update database 45 is provided for receiving and storing updates to content files. The database 45 can be implemented using any known database technology.

The database 45 is connected to the updating engine 44. The updating engine 44 is used to generate or compute the updated version of the content file using the updated information of the content file. The updated version of the content file is typically in the form of HTML pages. The updating engine 44 then sends the updated version of the content file to the content store 43 which is connected to the updating engine 44. In addition, the updating engine 44 notifies the file name binding server 42 of the update by sending the updated version of the content file to the server 42. Alternatively, the updating engine 44 does not send the updated version to the binding server 42. Instead, it sends the file reference to the binding server 42. Both the file name binding server 42 and the content store 43 are connected to each of the content servers 41–41n via a bus 49, which transmits both data and commands among various modules of the system 40.

The updating engine 44 can be implemented using any known web or Internet technology. The updating engine 44 can also be referred to as a file re-computation engine. The file re-computation process typically requires the engine 44 to query the database 45 to find the necessary information for constructing the updated version of the content file. The content store 43 can also be implemented using any known storage technology. Both modules 43–44 can be implemented in hardware, software, or firmware form.

The file name binding server 42 is used to generate a file reference that is unique to the updated version of the content file. The file name binding server 42 also maintains a file name binding table (not shown) which mapping file names to file references (i.e., a table of name-reference bindings). This means that one file name will only have one corresponding file reference.

The file name binding server 42 employs a cryptographic hash algorithm (e.g., the MD5 hash algorithm) to generate the file reference. This makes it possible for the file reference to be probabilistically unique to the corresponding version of the content file. The file name binding server 42 then updates its binding table with the new file reference. It is to be noted that each file name in the table only corresponds to one file reference. If a new file reference is generated for the file name, any prior file reference corresponding to the same file name will be deleted or replaced. The file name binding server 42 also broadcasts the name-reference binding to the binding table (e.g., the table 104) of all of the content servers 41–41*n*.

Alternatively, the hash function is performed in the updating engine 44 and the name-reference binding is sent to the server 42 from the engine 44. The server 42 then compares the new binding with the existing binding already stored. If the two are the same, then the server 42 does nothing. Otherwise, the server 42 replaces the old binding with the new binding, and then broadcasts the new binding to all of the content servers 41–41*n* via the bus 49. The file name binding server 42 can be implemented using any known technology, and in the form of software, hardware, or firmware.

The content store 43 provides a mechanism for retrieving a version of a content file based on a file reference provided. When the updating engine 44 sends a version of a content file to the content store 43, the content store 43 computes the corresponding file reference of that version of the content file using the same hash algorithm used by the server 42 to generate the file reference. The content store 43 then creates book-keeping entries that allow the retrieval of the content files. Alternatively, the content store 43 does not generate the file reference. In this case, the content store 43 receives the file reference from the server 42 via the bus 49 when the server 42 generates the file reference.

Referring to FIGS. 3 and 4, during an update operation, the update for a particular content file with a file name is first sent to the update database 45 to trigger the update operation. At this time, a version of the content file is hosted in each of the content servers 41–41*n*. At the same time, an update command is received in the updating engine 44. Alternatively, there is no update command to the updating engine 44. In this case, when the update database 45 receives the update for the content file, it generates a notification to the updating engine 44 to inform the updating engine 44 that an update operation is needed for the particular content file.

The updating engine 44 then generates or computes the updated version of the content file using the updated information of the content file in the database 45. As is known, the content file may be in the form of one or more HTML pages. For example, when the update for a content file with a file name of "/topics/domestic/news.html" is received in the update database 45, the updating engine 44 will obtain the previous version of the content file. The updating engine 44 then generates the updated version of the content file in the form of HTML pages. The updated version of the content file is then stored in the content store 43. In addition, the updating engine 44 sends the updated version of the content file to the file name binding server 42. As described above, the file name binding server 42 stores a file name binding table which lists the file name-file reference pair for all content files. This means that one file name will only have one corresponding file reference.

The file name binding server 42 then applies a cryptographic hash algorithm (e.g., the MD5 hash algorithm) to the updated version of the content file in order to produce the file reference of the updated version of the content file. The hash algorithm can be any known hash algorithm that is currently commercially available. The file reference is probabilistically unique and immutable to the updated version of the content file. This means that the file reference uniquely identifies the updated version of the content file. If the content file is updated again and a new version is generated, a new file reference will be generated to uniquely identify that version of the content file.

The file name binding server 42 then updates its file name binding table with the newly generated file reference that identifies the updated version of the content file. In addition, the file name binding server 42 also causes the binding table 104 in each of the content servers 41–41*n* to be updated with the new file reference. As described above, the reference stored in the binding table 104 is a local copy of that stored in the file name binding server 42. The file name binding server 42 updates the binding table 104 of each of the content servers 41–41*n* by broadcasting the new file reference for the updated version of the content file to each of the content servers 41–41*n* via the bus 49. Each content server, upon receiving such a notification, updates its own binding table to reflect the new file reference for the updated version of the content file. This then completes the update operation.

During an access operation to the content file, the HTTP engine 101 receives the request for the particular content file. The HTTP engine 101 then extracts the file name (e.g., "/topics/domestic/news.html") of the content file from the URL of the request. The file name is then used by the file manager 102 to access the binding table 104 for the corresponding file reference of the file name. In this case, the file reference should indicate the most recent version or updated version of the content file because whenever a content file is updated, a corresponding file reference will be generated and updated in the binding table 104. The file manager 102 then uses the file reference to access the cache 103 to retrieve the updated version of the content file that corresponds to the file reference.

If a cache hit is resulted (i.e., the updated version is in the cache 103), then the file manager 102 retrieves that version from the cache 102. A cache hit is typically resulted if the updated version has been requested before. If a cache miss is resulted (i.e., the updated version is not in the cache 103), then the file manager 102 performs a fetch operation to fetch that version of the content file from the content store 43 into the cache 103 via the bus 49.

Alternatively, the file manager 102 broadcasts a query via the bus 49 to all other peer content servers. This broadcast is dependent on the topology of the network and the design of the bus 49. The query is to see if the cache of those peer content servers stores the updated version of the content file or not. If so, the updated version of the content file is retrieved. Otherwise, the file manager 102 performs a fetch operation to fetch that version of the content file from the content store 43 into the cache 103 via the bus 49.

Once the file manager 102 obtains the updated version of the content, the file manager 102 verifies the content retrieved by applying it to a hash algorithm. If the outcome of the hash algorithm does not match the file reference, then the retrieved content is incorrect and the file manager 102 will access the cache 103 again for the updated version corresponding to the file reference.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A data service system, comprising:
    a plurality of duplicate content servers for hosting a content file with a file name, each content server storing a version of the same content file that is referred to by a file reference;

an updating engine that, when receiving an update of the content file, generates an updated version of the content file;

a file name binding server coupled to the updating engine and the content servers to generate a new file reference for the updated version of the content file, wherein the file name binding server updates each of the content servers with the updated version by sending the new file reference to each of the content servers.

2. The data service system of claim 1, further comprising a content store that stores the updated version of the content file before the updated version is fetched into the content servers.

3. The data service system of claim 1, wherein each of the content servers further comprises a cache that stores a version of the content file;

a file reference binding table that stores the new file reference of the updated version of the content file, wherein the new file reference is also associated with the file name of the content file;

a file manager that, when receiving a request for the content file with the file name, accesses the binding table to retrieve the new file reference using the file name, and then accesses the cache with the new file reference.

4. The data service system of claim 3, wherein the file manager verifies that the content retrieved is indeed the updated version of the content file by applying a hash algorithm to the retrieved content and then determining if its outcome matches the new file reference.

5. The data service system of claim 4, wherein if the outcome of the hash algorithm does not match the new file reference, the file manager accesses the cache again with the new file reference for the updated version of the content file.

6. The data service system of claim 3, wherein if a cache miss is resulted from the access to the cache with the new file reference, the file manager then fetches the updated version of the content file from an external content store that is coupled to the updating engine.

7. The data service system of claim 3, wherein each of the content servers further comprises an HTTP engine that extracts the file name of the content file from the request and sends the file name to the file manager.

8. The data service system of claim 3, wherein the content stored in the binding table in each of the content server is the same as that stored in the file name binding table server.

9. The data service system of claim 1, wherein the updating engine causes the file name binding table server to generate the new file reference when the updating engine generates the updated version of the content file.

10. In a data service system having a plurality of content servers hosting a content file with a file name, each content server comprising:

a cache that stores a version of the content file;

a file reference binding table that stores a file reference of a version of the content file, wherein the file reference is associated with the file name of the content file;

a file manager that, when receiving a request for the content file with the file name, accesses the binding table to retrieve the file reference using the file name, and then accesses the cache with the file reference for that version of the content file corresponding to the file reference.

11. The content server of claim 10, further comprising an HTTP engine that extracts the file name of the content file from the request and sends the file name to the file manager.

12. The content server of claim 10, wherein the file manager verifies that the content retrieved is indeed the particular version of the content file referenced by the file reference by applying a hash algorithm to the retrieved content and then determining if its outcome matches the new file reference.

13. The content server of claim 12, wherein if the outcome of the hash algorithm does not match the file reference, the file manager accesses the cache again with the file reference for that version of the content file.

14. The content server of claim 10, wherein if a cache miss is resulted from the access to the cache with the file reference, the file manager then fetches the version of the content file from an external content store.

15. The content server of claim 10, wherein the file reference binding table is updated with a new file reference when an update of the content file is received by the data service system, wherein the new file reference corresponds to the updated version of the content file.

16. The content server of claim 15, wherein the updated version of the content file is stored in a content file external to the content server.

* * * * *